(12) United States Patent
Xu et al.

(10) Patent No.: US 10,563,123 B2
(45) Date of Patent: Feb. 18, 2020

(54) CUINS$_2$/IN$_2$S$_3$/ZNS FLUORESCENT QUANTUM DOT WITH DOUBLE-LAYER CORE-SHELL STRUCTURE AND PREPARATION METHOD THEREOF

(71) Applicant: GUANGZHOU INSTITUTE OF ENERGY CONVERSION, CHINESE ACADEMY OF SCIENCES, Guangzhou (CN)

(72) Inventors: Xueqing Xu, Guangzhou (CN); Xin Wang, Guangzhou (CN); Dehui Xie, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 343 days.

(21) Appl. No.: 15/566,223

(22) PCT Filed: Aug. 24, 2015

(86) PCT No.: PCT/CN2015/087955
§ 371 (c)(1),
(2) Date: Oct. 13, 2017

(87) PCT Pub. No.: WO2016/179920
PCT Pub. Date: Nov. 17, 2016

(65) Prior Publication Data
US 2018/0327662 A1 Nov. 15, 2018

(30) Foreign Application Priority Data
May 14, 2015 (CN) .......................... 2015 1 0249711

(51) Int. Cl.
C09K 11/62 (2006.01)
C09K 11/02 (2006.01)
C09K 11/58 (2006.01)
B82Y 30/00 (2011.01)
B82Y 40/00 (2011.01)

(52) U.S. Cl.
CPC ............ *C09K 11/623* (2013.01); *C09K 11/02* (2013.01); *C09K 11/025* (2013.01); *C09K 11/584* (2013.01); *B82Y 30/00* (2013.01); *B82Y 40/00* (2013.01)

(58) Field of Classification Search
CPC ..... C09K 11/623; C09K 11/584; B82Y 30/00; B82Y 40/00
See application file for complete search history.

(56) References Cited

U.S. PATENT DOCUMENTS

2011/0108799 A1 5/2011 Pickett et al.

FOREIGN PATENT DOCUMENTS

| CN | 102086396 A | 6/2011 |
|---|---|---|
| CN | 102277158 A | 12/2011 |
| CN | 102718249 A | 10/2012 |
| CN | 103113882 A | 5/2013 |
| CN | 103242831 A | 8/2013 |
| CN | 103773364 A | 5/2014 |
| WO | WO2014209154 A1 | 12/2014 |

*Primary Examiner* — C Melissa Koslow
(74) *Attorney, Agent, or Firm* — Gokalp Bayramoglu

(57) ABSTRACT

The present invention provides a CuInS$_2$/In$_2$S$_3$/ZnS fluorescent quantum dot with a double-layer core-shell structure, aiming to overcome the defects of the existing CuInS$_2$ quantum dots. CuInS$_2$ serves as a core, In$_2$S$_3$ serves as a first shell for cladding the core, and ZnS serves as a second shell for cladding the first shell. The present invention further provides a preparation method for the CuInS$_2$/In$_2$S$_3$/ZnS fluorescent quantum dot with a double-layer core-shell structure. The CuInS$_2$ quantum dot is synthesized using two stabilizers, and indium thiophosphate serves as a monomolecular precursor of the In$_2$S$_3$ shell.

9 Claims, 1 Drawing Sheet

CUINS₂/IN₂S₃/ZNS FLUORESCENT QUANTUM DOT WITH DOUBLE-LAYER CORE-SHELL STRUCTURE AND PREPARATION METHOD THEREOF

CROSS REFERENCE TO RELATED APPLICATIONS

This application is the national phase entry of International Application No. PCT/CN2015/087955, filed on Aug. 24, 2015, which is based upon and claims priority to Chinese Patent Application No. 201510249711.7, filed on May 14, 2015, the entire contents of which are incorporated herein by reference.

TECHNICAL FILED

The present invention is related to the technical field of manufacturing semiconductor nanomaterials, and particularly to a $CuInS_2/In_2S_3/ZnS$ fluorescent quantum dot with double-layer core-shell structure, and a preparation method thereof.

BACKGROUND OF THE INVENTION

Quantum dots are semiconductor nanocrystals whose particle sizes are smaller than their Bohr radiuses (about 10 nm). Due to discrete energy states of the quantum dots, motion of conduction band electrons and valence band holes are confined in a three-dimensional potential well, which leads to unique physical properties. With the quantum size effects, optical and electrical properties of a quantum dot can be flexibly tuned by adjusting its size, which facilitate the infrared light absorption and emission of inorganic quantum dots compared with traditional organic light absorbers. In addition, low-cost preparation of semiconductor devices, especially those flexible devices with plastic substrate, can be achieved by preparing quantum dot films via cheap process such as printing or roller coating, from quantum dot colloidal solution formed by dispersing quantum dots in a solvent. With such characteristics, quantum dots exhibit attractive and broad application prospects in various technical fields, such as novel light-emitting diodes (LEDs), efficient and low-cost stacked solar cells, infrared light detectors, semiconductor lasers, and biological fluorescence imaging.

As $CuInS_2$ quantum dots are free of heavy metals and non-toxic, they become research hotspots in the field of fluorescent quantum dots. However, the fluorescence quantum yields of $CuInS_2$ quantum dots are low, generally below 10%. In order to improve the fluorescence quantum yield of the $CuInS_2$ quantum dots and enhance the photochemical stability thereof, some techniques have been developed including constructing alloy quantum dots such as $ZnCuInS_2$, and constructing quantum dots with core-shell structure such as $CuInS_2/CdS$ and $CuInS_2/ZnS$. However, the $CuInS_2/CdS$ comprises cadmium, and the $CuInS_2/ZnS$ involves a blue shift in fluorescence emission which leads to a lower quantum yields of dots in red region.

SUMMARY OF THE INVENTION

In view of the defects of existing $CuInS_2$ quantum dots, the present invention constructs a $CuInS_2/In_2S_3/ZnS$ fluorescent quantum dot with double-layer core-shell structure that can improve quantum yield in red region. Technical solutions of the present invention are as follows.

Provided is a $CuInS_2/In_2S_3/ZnS$ fluorescent quantum dot with double-layer core-shell structure, comprising a core formed of $CuInS_2$, a first shell formed of $In_2S_3$ cladding the core, and a second shell formed of ZnS cladding the first shell.

Preferably, in the quantum dot, a molar ratio of $CuInS_2$ to $In_2S_3$ is 1:0.5~5, and a molar ratio of $CuInS_2$ to ZnS is 1:1~4.

The present invention further provides a preparation method of the above $CuInS_2/In_2S_3/ZnS$ fluorescent quantum dot with double-layer core-shell structure, wherein a $CuInS_2$ quantum dot is synthesized with two stabilizers, and dialkyldithiophosphate salt serves as a monomolecular precursor for the $In_2S_3$ shell, comprising the following steps:

step (1): uniformly mixing a copper source, an indium source, an alkyl amine, an alkyl mercaptan and a non-polar solvent to obtain a solution, wherein, a molar ratio of the alkyl mercaptan to the alkyl amine is 8~10:1, a concentration of the copper source is 0.01~0.1 mol/L, and the copper source, the indium source and the alkyl mercaptan are in such proportion that a molar ratio of Cu:In:S is 1:1~1.5:25~250; keeping the solution at 200~230° C. for 5-60 minutes for reaction, and then cooling the solution to terminate the reaction; subjecting the solution to centrifugation to obtain a precipitate, and dissolving the precipitate in the non-polar solvent to obtain a $CuInS_2$ quantum dot solution having a concentration of 0.005~0.02 mol/L. Preferably, the above mentioned mixing process comprises: evacuating and purging with nitrogen for several times under stirring, and then keeping the solution at 100° C. under a nitrogen atmosphere until the solution becomes clear.

step (2): uniformly mixing an indium thiophosphate, an alkyl mercaptan and a non-polar solvent to obtain an $In_2S_3$ precursor solution, wherein, the indium thiophosphate is indium dialkyldithiophosphate or indium dicresyl dithiophosphate, a concentration of the indium thiophosphate is 0.005~0.02 mol/L, and a molar ratio of the indium thiophosphate to the alkyl mercaptan is 1:10~50; adding the $In_2S_3$ precursor solution dropwise into the $CuInS_2$ quantum dot solution obtained in step (1) at 220~240° C., maintaining the temperature for 30~60 minutes (and under a nitrogen atmosphere preferably) for reaction, and then cooling the solution to terminate the reaction; subjecting the solution to centrifugation to obtain a precipitate, and dissolving the precipitate in the non-polar solvent to obtain a $CuInS_2/In_2S_3$ quantum dot solution having a concentration of 0.005~0.02 mol/L;

step (3): uniformly mixing zinc diethyldithiocarbamate, an alkyl mercaptan and a non-polar solvent to obtain a ZnS precursor solution, wherein, a concentration of the zinc diethyldithiocarbamate is 0.005~0.02 mol/L, and a molar ratio of the zinc diethyldithiocarbamate to the alkyl mercaptan is 1:10~50; adding the ZnS precursor solution dropwise into the $CuInS_2/In_2S_3$ quantum dot solution obtained in step (2) at 220~240° C., maintaining the temperature for 30~60 minutes for reaction, and then cooling the solution to terminate the reaction and thereby obtain a $CuInS_2/In_2S_3/ZnS$ quantum dot solution;

step (4): adding ethanol or acetone into the $CuInS_2/In_2S_3/ZnS$ quantum dot solution obtained in step (3), wherein volume of the ethanol or acetone is preferably five times of that of the $CuInS_2/In_2S_3/ZnS$ quantum dot solution; subjecting the solution to centrifugation to obtain the fluorescent quantum dot with double-layer core-shell structure.

Preferably, in step (2), the $CuInS_2$ quantum dot solution and the $In_2S_3$ precursor solution are in such proportion that a molar ratio of Cu:In is 1:1~10; in step (3), the $CuInS_2/In_2S_3$ quantum dot solution and the ZnS precursor solution are in such proportion that a molar ratio of Cu:Zn is 1:1~4. With such proportions, we can obtain a quantum dot in which a molar ratio of $CuInS_2:In_2S_3$ is 1:0.5~5 and a molar ratio of $CuInS_2:In_2S_3$ is 1:1~4.

Preferably, in step (2), the indium dialkyldithiophosphate is selected from indium diethyldithiophosphate, indium diisopropyl dithiophosphate, indium diisobutyl dithiophosphate, indium di-sec-butyl dithiophosphate and indium diisopentyl dithiophosphate.

Preferably, the non-polar solvent is an alkyl mercaptan or an aliphatic olefin.

Preferably, the aliphatic olefin is hexadecylene or octadecylene.

Preferably, the copper source is selected from cuprous chloride, cuprous iodide and cuprous acetate; and the indium source is selected from indium acetate, indium nitrate, and indium chloride.

Preferably, the alkyl mercaptan is dodecyl mercaptan or hexadecyl mercaptan; and the alkyl amine is selected from oleylamine, dodecyl amine and hexadecyl amine.

Compared with the prior arts, the present invention has the following advantages:

(1) The $CuInS_2/In_2S_3/ZnS$ fluorescent quantum dot with double-layer core-shell structure is non-toxic, and the quantum yield in red region can reach over 80%.

(2) Two stabilizers, an alkyl mercaptan and an alkyl amine, are used simultaneously to prepare the $CuInS_2$ quantum dot, such that the density of the defect states on the surface of the quantum dot can be reduced, and the quantum yield is improved.

(3) In the preparation of the $In_2S_3$ shell, indium thiophosphate serves as a monomolecular precursor, and when the temperature of the reacting system rises to its thermal decomposition temperature, $In^{3+}$ ions and $H_2S$ will be released, and a conspicuous $In_2S_3$ shell is formed via a rapid heterogeneous nucleation process preventing the diffusion of the indium ions into the $CuInS_2$ core and the ion exchange thereof with $Cu^+$ ions, and as a result, blue shift is prevented and the quantum yield in red region is promising.

Figure 1:
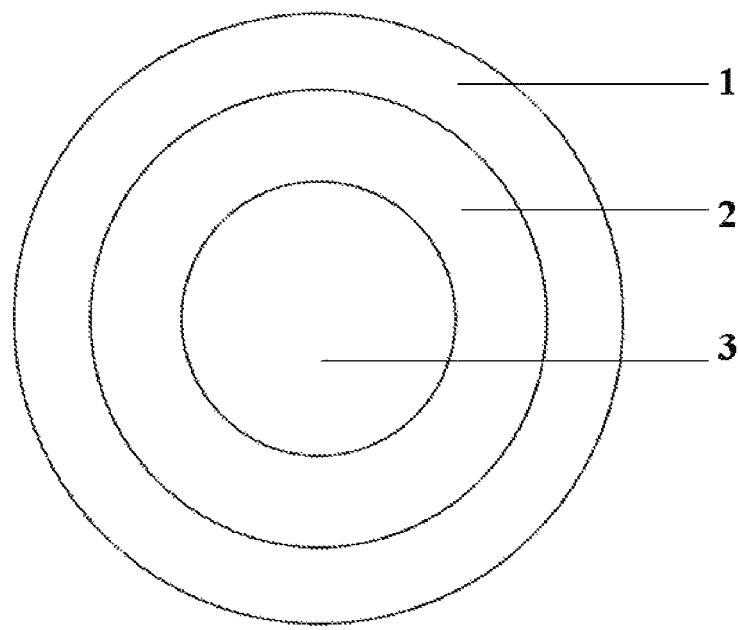
FIG. 1 is a schematic view of a $CuInS_2/In_2S_3/ZnS$ fluorescent quantum dot with double-layer core-shell structure according to the present invention.
Figure 2:
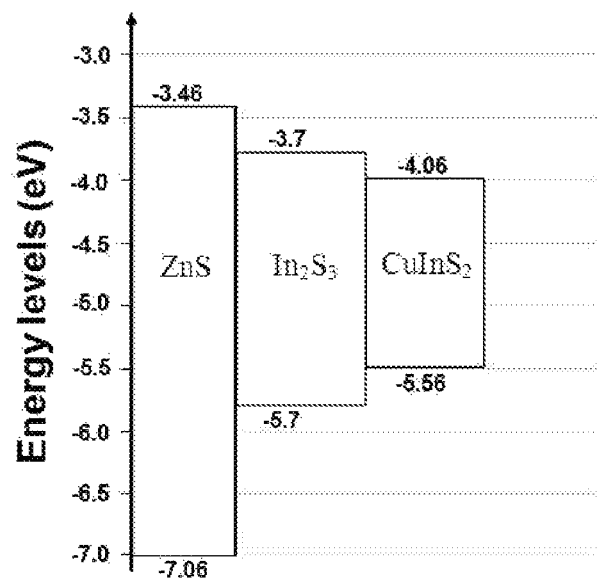
FIG. 2 shows the energy levels in the $CuInS_2/In_2S_3/ZnS$ fluorescent quantum dot with double-layer core-shell structure according to the present invention.

Reference characters in the drawings: 1: ZnS shell; 2: $In_2S_3$ shell; and 3: $CuInS_2$ core.

DETAILED DESCRIPTION OF THE INVENTION

Embodiment 1

Step (1): adding 0.1 mmol of cuprous iodide and 0.1 mmol of indium acetate into a mixed solution consisting of 25 mmol of dodecyl mercaptan (serving as a sulfur source and a stabilizer), 2.5 mmol of oleylamine, and octadecylene (serving as solvent), in such proportion that the concentration of cuprous iodide is 0.01 mol/L; evacuating and purging with nitrogen for three times under stirring, and then keeping the solution at 100° C. under a nitrogen atmosphere until the solution becomes clear; then bringing and keeping the solution at 230° C. for 5 minutes for reaction, and then cooling the solution to terminate the reaction; subjecting the solution to centrifugation to obtain a precipitate, and dissolving the precipitate in octadecylene to obtain a $CuInS_2$ quantum dot solution having a concentration of 0.01 mol/L.

Step (2): adding 1.0 mmol of indium diethyldithiophosphate and 20 mmol of dodecyl mercaptan into octadecylene to obtain an $In_2S_3$ precursor solution (wherein a concentration of the indium diethyldithiophosphate is 0.01 mol/L); adding the $In_2S_3$ precursor solution dropwise into the $CuInS_2$ quantum dot solution obtained in step (1) at 230° C., maintaining the temperature for 45 minutes for reaction under a nitrogen atmosphere, and then cooling the solution to terminate the reaction; subjecting the solution to centrifugation to obtain a precipitate, and dissolving the precipitate in octadecylene to obtain a $CuInS_2/In_2S_3$ quantum dot solution having a concentration of 0.01 mol/L;

Step (3): adding 0.4 mmol of zinc diethyldithiocarbamate and 8 mmol of dodecyl mercaptan into octadecylene to obtain a ZnS precursor solution (wherein a concentration of the zinc diethyldithiocarbamate solution is 0.01 mol/L); adding the ZnS precursor solution dropwise into the $CuInS_2/In_2S_3$ quantum dot solution obtained in step (2) at 230° C., maintaining the temperature for 45 minutes for reaction, and then cooling the solution to terminate the reaction and thereby obtain a $CuInS_2/In_2S_3/ZnS$ quantum dot solution;

Step (4): adding ethanol into the $CuInS_2/In_2S_3/ZnS$ quantum dot solution obtained in step (3), wherein volume of the ethanol is five times of that of the $CuInS_2/In_2S_3/ZnS$ quantum dot solution; subjecting the solution to centrifugation to obtain the fluorescent quantum dot with double-layer core-shell structure.

Embodiment 2

The process in this embodiment is generally identical to that in embodiment 1, except for the following aspects:

In step (1), 0.5 mmol of cuprous iodide and 0.625 mmol of indium acetate are added into a mixed solution consisting of 25 mmol of dodecyl mercaptan (serving as a sulfur source and a stabilizer), 2.5 mmol of oleylamine, and octadecylene (serving as solvent), in such proportion that the concentration of cuprous iodide is 0.05 mol/L, and concentration of the resulting $CuInS_2$ quantum dot solution is controlled to be 0.005 mol/L.

In Step (2), 5.0 mmol of indium diethyldithiophosphate and 250 mmol of dodecyl mercaptan are added into octadecylene to obtain an $In_2S_3$ precursor solution (wherein a concentration of the indium diethyldithiophosphate is 0.005 mol/L); the $In_2S_3$ precursor solution is added dropwise into the $CuInS_2$ quantum dot solution obtained in step (1) at 220° C., followed by maintaining the temperature for 60 minutes for reaction under a nitrogen atmosphere; and concentration of the resulting $CuInS_2/In_2S_3$ quantum dot solution is controlled to be 0.005 mol/L.

In step (3), 2 mmol of zinc diethyldithiocarbamate and 100 mmol of dodecyl mercaptan are added into octadecylene to obtain a ZnS precursor solution (wherein a concentration of the zinc diethyldithiocarbamate is 0.005 mol/L); the ZnS precursor solution is added dropwise into the $CuInS_2/In_2S_3$ quantum dot solution obtained in step (2) at 220° C., followed by maintaining the temperature for 60 minutes for reaction.

In step (4), acetone is added into the $CuInS_2/In_2S_3/ZnS$ quantum dot solution, wherein volume of the acetone is five times of that of the $CuInS_2/In_2S_3/ZnS$ quantum dot solution.

Embodiment 3

The process in this embodiment is generally identical to that in embodiment 1, except for the following aspects:

In step (1), 1 mmol of cuprous iodide and 1.5 mmol of indium acetate are added into a mixed solution consisting of 25 mmol of dodecyl mercaptan (serving as a sulfur source and a stabilizer), 2.5 mmol of oleylamine, and octadecylene (serving as solvent), in such proportion that the concentration of cuprous iodide is 0.1 mol/L, and concentration of the resulting $CuInS_2$ quantum dot solution is controlled to be 0.02 mol/L.

In Step (2), 10.0 mmol of indium diethyldithiophosphate and 100 mmol of dodecyl mercaptan are added into octadecylene to obtain an $In_2S_3$ precursor solution (wherein a concentration of the indium diethyldithiophosphate is 0.02 mol/L); the $In_2S_3$ precursor solution is added dropwise into the $CuInS_2$ quantum dot solution obtained in step (1) at 220° C., followed by maintaining the temperature for 60 minutes for reaction under a nitrogen atmosphere; and concentration of the resulting $CuInS_2/In_2S_3$ quantum dot solution is controlled to be 0.02 mol/L.

In step (3), 4 mmol of zinc diethyldithiocarbamate and 40 mmol of dodecyl mercaptan are added into octadecylene to obtain a ZnS precursor solution (wherein a concentration of the zinc diethyldithiocarbamate is 0.02 mol/L); the ZnS precursor solution is added dropwise into the $CuInS_2/In_2S_3$ quantum dot solution obtained in step (2) at 220° C., followed by maintaining the temperature for 60 minutes for reaction.

Embodiment 4

The process in this embodiment is generally identical to that in embodiment 1, except for the following aspects:

In step (2), 0.5 mmol of indium diethyldithiophosphate and 10 mmol of dodecyl mercaptan are added into octadecylene to obtain an $In_2S_3$ precursor solution (wherein a concentration of the indium diethyldithiophosphate is 0.01 mol/L), and the reaction is controlled to take place at 240° C. for 30 minutes.

In step (3), 0.2 mmol of zinc diethyldithiocarbamate and 4 mmol of dodecyl mercaptan are added into octadecylene to obtain a ZnS precursor solution (wherein a concentration of the zinc diethyldithiocarbamate is 0.01 mol/L), and the reaction is controlled to take place at 240° C. for 30 minutes.

Embodiment 5

The process in this embodiment is generally identical to that in embodiment 1, except for the following aspects:

In step (2), 0.1 mmol of indium diethyldithiophosphate and 2 mmol of dodecyl mercaptan are added into octadecylene to obtain an $In_2S_3$ precursor solution (wherein a concentration of the indium diethyldithiophosphate is 0.01 mol/L).

In step (3), 0.1 mmol of zinc diethyldithiocarbamate and 2 mmol of dodecyl mercaptan are added into octadecylene to obtain a ZnS precursor solution (wherein a concentration of the zinc diethyldithiocarbamate is 0.01 mol/L).

Embodiment 6

The process in this embodiment is generally identical to that in embodiment 1, except for that the molar ratio of dodecyl mercaptan to oleylamine is 8:1.

Embodiment 7

The process in this embodiment is generally identical to that in embodiment 1, except for that the molar ratio of dodecyl mercaptan to oleylamine is 9:1.

Embodiment 8

The process in this embodiment is generally identical to that in embodiment 1, except for that the non-polar solvent in step (1) is dodecyl mercaptan.

Embodiment 9

The process in this embodiment is generally identical to that in embodiment 1, except for that the non-polar solvent in step (1) is hexadecyl mercaptan.

Embodiment 10

The process in this embodiment is generally identical to that in embodiment 1, except for that the copper source is cuprous chloride.

Embodiment 11

The process in this embodiment is generally identical to that in embodiment 1, except for that the copper source is cuprous acetate.

Embodiment 12

The process in this embodiment is generally identical to that in embodiment 1, except for that the indium source is indium nitrate.

Embodiment 13

The process in this embodiment is generally identical to that in embodiment 1, except for that the indium source is indium chloride.

Embodiment 14

The process in this embodiment is generally identical to that in embodiment 1, except for that the mercaptan is hexadecyl mercaptan.

Embodiment 15

The process in this embodiment is generally identical to that in embodiment 1, except for that the alkyl amine is hexadecyl amine.

Embodiment 16

The process in this embodiment is generally identical to that in embodiment 1, except for that the alkyl amine is dodecyl amine.

Embodiment 17

The process in this embodiment is generally identical to that in embodiment 1, except for that the non-polar solvent is hexadecylene.

Embodiment 18

The process in this embodiment is generally identical to that in embodiment 1, except for that the reaction in step (1) takes place for 15 minutes.

Embodiment 19

The process in this embodiment is generally identical to that in embodiment 1, except for that the reaction in step (1) takes place for 30 minutes.

Embodiment 20

The process in this embodiment is generally identical to that in embodiment 1, except for that the reaction in step (1) takes place for 60 minutes.

Embodiment 21

The process in this embodiment is generally identical to that in embodiment 1, except for that the reaction in step (1) takes place at 215° C.

Embodiment 22

The process in this embodiment is generally identical to that in embodiment 1, except for that the reaction in step (1) takes place at 200° C.

Embodiment 23

The process in this embodiment is generally identical to that in embodiment 1, except for that the indium thiophosphate in step (2) is indium diisopropyl dithiophosphate.

Embodiment 24

The process in this embodiment is generally identical to that in embodiment 1, except for that the indium thiophosphate in step (2) is indium diisobutyl dithiophosphate.

Embodiment 25

The process in this embodiment is generally identical to that in embodiment 1, except for that the indium thiophosphate in step (2) is indium di-sec-butyl dithiophosphate.

Embodiment 26

The process in this embodiment is generally identical to that in embodiment 1, except for that the indium thiophosphate in step (2) is indium diisopentyl dithiophosphate.

Embodiment 27

The process in this embodiment is generally identical to that in embodiment 1, except for that the indium thiophosphate in step (2) is indium dicresyl dithiophosphate.

Comparative Example 1

The process in this embodiment is generally identical to that in embodiment 1, except for that the precursor of $In_2S_3$ in step (2) is indium acetate.

Comparative Example 2

The process in this embodiment is generally identical to that in embodiment 1, except for that oleylamine is not added in step (1).

Table 1 shows the fluorescence emission peak position and the corresponding fluorescence quantum yield of the $CuInS_2/In_2S_3/ZnS$ fluorescent quantum dot prepared in each embodiment and comparative example.

The fluorescence quantum yields are obtained by the following method.

With the aid of a fluorescence spectrophotometer and an ultraviolet-visible spectrophotometer, the fluorescence quantum yields are measured by the reference method in dilute solution, comprising the following steps: (1) measuring the absorbance of each of the $CuInS_2/In_2S_3/ZnS$ samples and the standard example at a certain wavelength; (2) measuring the fluorescence emission spectrum of the $CuInS_2/In_2S_3/ZnS$ samples and the standard example, under a same excitation condition at a certain wavelength; (3) the fluorescence quantum yields of the $CuInS_2/In_2S_3/ZnS$ samples are obtained by the following equation:

$$\Phi_U = \frac{A_S I_U n_U^2}{A_U I_S n_S^2} \times \Phi_S = \frac{I_u/A_u}{I_s/A_s} \times \frac{n_u^2}{n_s^2} \times \Phi_s$$

$\Phi_U$ and $\Phi_S$ are respectively the quantum yields of the $CuInS_2/In_2S_3/ZnS$ sample and the standard sample, $I_U$ and $I_S$ are respectively the integrated fluorescence intensity of the $CuInS_2/In_2S_3/ZnS$ sample and the standard sample, $A_U$ and $A_S$ are respectively the absorbance of the $CuInS_2/In_2S_3/ZnS$ sample and the standard sample at the corresponding excitation wavelength, which are both less than 0.05, and $n_u$ and $n_s$ are respectively the refractive indexes of the solvent in the $CuInS_2/In_2S_3/ZnS$ sample and that in the standard sample. The solvent in the $CuInS_2/In_2S_3/ZnS$ sample is n-hexane ($n_u$=1.388), and the solvent in the standard sample is ethanol ($n_s$=1.3614). The reference standard is Rhodamine 6G (Rh-6G).

As shown in the comparative example 1, when using indium acetate as the precursor of $In_2S_3$, the fluorescence wavelength is 570 nm, indicating a significant blueshift that affects the quantum yield in red region. When using indium dialkyldithiophosphate or indium dicresyl dithiophosphate, the fluorescence wavelength is greater than 630 nm, resulting in a greater quantum yield in red region.

As shown in the comparative example 2, when using only alkyl mercaptan without alkyl amine, the resulting quantum yield is lower, which is only 72%.

TABLE 1

| | Details of the embodiments | | | | | | | | |
|---|---|---|---|---|---|---|---|---|---|
| | Step (1) | | | | | Step (2) | | Step (3) | Performance | |
| | Cu concentration (mol/L) | Cu:In:S molar ratio | Mercaptan:amine molar ratio | Temperature (° C.) | Time (min) | Cu:In molar ratio | Indium concentration (mol/L) | Cu:Zn molar ratio | Quantum yield (%) | Fluorescence wavelength (nm) |
| 1 | 0.01 | 1:1:250 | 10:1 | 230 | 5 | 1:10 | 0.01 | 1:4 | 82 | 630 |
| 2 | 0.05 | 1:1.25:50 | 10:1 | 230 | 5 | 1:10 | 0.005 | 1:4 | 83 | 630 |

TABLE 1-continued

Details of the embodiments

| | Step (1) | | | | | Step (2) | | Step (3) | Performance | |
| --- | --- | --- | --- | --- | --- | --- | --- | --- | --- | --- |
| | Cu concentration (mol/L) | Cu:In:S molar ratio | Mercaptan:amine molar ratio | Temperature (° C.) | Time (min) | Cu:In molar ratio | Indium concentration (mol/L) | Cu:Zn molar ratio | Quantum yield (%) | Fluorescence wavelength (nm) |
| 3 | 0.1 | 1:1.5:25 | 10:1 | 230 | 5 | 1:10 | 0.02 | 1:4 | 85 | 630 |
| 4 | 0.01 | 1:1:250 | 10:1 | 230 | 5 | 1:5 | 0.01 | 1:2 | 75 | 630 |
| 5 | 0.01 | 1:1:250 | 10:1 | 230 | 5 | 1:1 | 0.01 | 1:1 | 70 | 630 |
| 6 | 0.01 | 1:1:250 | 8:1 | 230 | 5 | 1:10 | 0.01 | 1:4 | 82 | 630 |
| 7 | 0.01 | 1:1:250 | 9:1 | 230 | 5 | 1:10 | 0.01 | 1:4 | 82 | 630 |
| 8 | Identical with embodiment 1 except for that the non-polar solvent in step (1) is dodecyl mercaptan. | | | | | | | | 80 | 630 |
| 9 | Identical with embodiment 1 except for that the non-polar solvent in step (1) is hexadecyl mercaptan. | | | | | | | | 80 | 630 |
| 10 | Identical with embodiment 1 except for that the copper source is cuprous chloride. | | | | | | | | 75 | 630 |
| 11 | Identical with embodiment 1 except for that the copper source is cuprous acetate. | | | | | | | | 80 | 630 |
| 12 | Identical with embodiment 1 except for that the indium source is indium nitrate. | | | | | | | | 80 | 630 |
| 13 | Identical with embodiment 1 except for that the indium source is indium chloride. | | | | | | | | 80 | 630 |
| 14 | Identical with embodiment 1 except for that the mercaptan is hexadecyl mercaptan. | | | | | | | | 80 | 630 |
| 15 | Identical with embodiment 1 except for that the alkyl amine is hexadecyl amine | | | | | | | | 75 | 630 |
| 16 | Identical with embodiment 1 except for that the alkyl amine is dodecyl amine. | | | | | | | | 75 | 630 |
| 17 | Identical with embodiment 1 except for that the non-polar solvent is hexadecylene. | | | | | | | | 78 | 630 |
| 18 | 0.01 | 1:1:250 | 10:1 | 230 | 15 | 1:10 | 0.01 | 1:4 | 80 | 670 |
| 19 | 0.01 | 1:1:250 | 10:1 | 230 | 30 | 1:10 | 0.01 | 1:4 | 80 | 705 |
| 20 | 0.01 | 1:1:250 | 10:1 | 230 | 60 | 1:10 | 0.01 | 1:4 | 80 | 775 |
| 21 | 0.01 | 1:1:250 | 10:1 | 215 | 15 | 1:10 | 0.01 | 1:4 | 80 | 720 |
| 22 | 0.01 | 1:1:250 | 10:1 | 200 | 15 | 1:10 | 0.01 | 1:4 | 80 | 690 |
| 23 | Identical with embodiment 1 except for that the indium thiophosphate is indium diisopropyl dithiophosphate. | | | | | | | | 82 | 630 |
| 24 | Identical with embodiment 1 except for that the indium thiophosphate is indium diisobutyl dithiophosphate. | | | | | | | | 82 | 630 |
| 25 | Identical with embodiment 1 except for that the indium thiophosphate is indium di-sec-butyl dithiophosphate. | | | | | | | | 82 | 630 |
| 26 | Identical with embodiment 1 except for that the indium thiophosphate is indium diisopentyl dithiophosphate. | | | | | | | | 82 | 630 |
| 27 | Identical with embodiment 1 except for that the indium thiophosphate is indium dicresyl dithiophosphate. | | | | | | | | 82 | 630 |
| C1 | Identical with embodiment 1 except for that the precursor of $In_2S_3$ is indium acetate. | | | | | | | | 82 | 570 |
| C2 | Identical with embodiment 1 except for that oleylamine is not added in step (1). | | | | | | | | 72 | 630 |

What is claimed is:

1. A $CuInS_2/In_2S_3/ZnS$ fluorescent quantum dot with double-layer core-shell structure, comprising a core formed of $CuInS_2$, a first shell formed of $In_2S_3$ cladding the core, and a second shell formed of ZnS cladding the first shell.

2. The $CuInS_2/In_2S_3/ZnS$ fluorescent quantum dot with double-layer core-shell structure of claim 1, wherein a molar ratio of $CuInS_2$ to $In_2S_3$ is 1:0.5-5, and a molar ratio of $CuInS_2$ to ZnS is 1:1-4.

3. A preparation method of the $CuInS_2/In_2S_3/ZnS$ fluorescent quantum dot with double-layer core-shell structure of claim 1, comprising the following steps:

step (1): uniformly mixing a copper source, an indium source, an alkyl amine, an alkyl mercaptan and a non-polar solvent to obtain a solution, wherein, a molar ratio of the alkyl mercaptan to the alkyl amine is 8-10:1, a concentration of the copper source is 0.01-0.1 mol/L, and the copper source, the indium source and the alkyl mercaptan are in such proportion that a molar ratio of Cu:In:S is 1:1-1.5:25-250; keeping the solution at 200-230° C. for 5-60 minutes for reaction, and then cooling the solution to terminate the reaction; performing a centrifugal purification to obtain a precipitate, then dissolving the precipitate in the non-polar solvent to obtain a $CuInS_2$ quantum dot solution having a concentration of 0.005-0.02 mol/L;

step (2): uniformly mixing an indium thiophosphate, an alkyl mercaptan and a non-polar solvent to obtain an $In_2S_3$ precursor solution, wherein, the indium thiophosphate is indium dialkyldithiophosphate or indium dicresyl dithiophosphate, a concentration of the indium thiophosphate is 0.005-0.02 mol/L, and a molar ratio of the indium thiophosphate to the alkyl mercaptan is 1:10-50; adding the $In_2S_3$ precursor solution dropwise into the $CuInS_2$ quantum dot solution obtained in step (1) at 220-240° C., maintaining the temperature for 30-60 minutes for reaction, and then cooling the solution to terminate the reaction; performing a centrifugal purification to obtain a precipitate, then dissolving the precipitate in the non-polar solvent to obtain a $CuInS_2/In_2S_3$ quantum dot solution having a concentration of 0.005-0.02 mol/L;

step (3): uniformly mixing a zinc diethyldithiocarbamate, an alkyl mercaptan and a non-polar solvent to obtain a ZnS precursor solution, wherein, a concentration of the zinc diethyldithiocarbamate is 0.005-0.02 mol/L, and a molar ratio of the zinc diethyldithiocarbamate to the alkyl mercaptan is 1:10-50; adding the ZnS precursor solution dropwise into the $CuInS_2/In_2S_3$ quantum dot solution obtained in step (2) at 220-240° C., maintaining the temperature for 30-60 minutes for reaction, and then cooling the solution to terminate the reaction and thereby a $CuInS_2/In_2S_3/ZnS$ quantum dot solution is obtained;

step (4): adding ethanol or acetone into the $CuInS_2/In_2S_3/ZnS$ quantum dot solution obtained in step (3), subjecting the solution to centrifugation to obtain the fluorescent quantum dot with double-layer core-shell structure.

4. The preparation method of the $CuInS_2/In_2S_3/ZnS$ fluorescent quantum dot with double-layer core-shell structure of claim 3, wherein in step (2), the $CuInS_2$ quantum dot solution and the $In_2S_3$ precursor solution are in such proportion that a molar ratio of Cu:In is 1:1-10; in step (3), the $CuInS_2/In_2S_3$ quantum dot solution and the ZnS precursor solution are in such proportion that a molar ratio of Cu:Zn is 1:1-4.

5. The preparation method of the $CuInS_2/In_2S_3/ZnS$ fluorescent quantum dot with double-layer core-shell structure of claim 3, wherein in step (2), the indium dialkyldithiophosphate is selected from the group consisting of indium diethyldithiophosphate, indium diisopropyl dithiophosphate, indium diisobutyl dithiophosphate, indium di-sec-butyl dithiophosphate and indium diisopentyl dithiophosphate.

6. The preparation method of the $CuInS_2/In_2S_3/ZnS$ fluorescent quantum dot with double-layer core-shell structure of claim 3, wherein the non-polar solvent is an alkyl mercaptan or an aliphatic olefin.

7. The preparation method of the $CuInS_2/In_2S_3/ZnS$ fluorescent quantum dot with double-layer core-shell structure of claim 6, wherein the aliphatic olefin is hexadecylene or octadecylene.

8. The preparation method of the $CuInS_2/In_2S_3/ZnS$ fluorescent quantum dot with double-layer core-shell structure of claim 3, wherein the copper source is selected from the group consisting of cuprous chloride, cuprous iodide and cuprous acetate; and the indium source is selected from the group consisting of indium acetate, indium nitrate, and indium chloride.

9. The preparation method of the $CuInS_2/In_2S_3/ZnS$ fluorescent quantum dot with double-layer core-shell structure of claim 3, wherein the alkyl mercaptan is dodecyl mercaptan or hexadecyl mercaptan; and the alkyl amine is selected from the group consisting of oleylamine, dodecyl amine and hexadecyl amine.

* * * * *